(12) United States Patent
Van Den Berg et al.

(10) Patent No.: US 7,614,361 B2
(45) Date of Patent: Nov. 10, 2009

(54) METHOD OF AUTOMATICALLY MILKING A DAIRY ANIMAL

(75) Inventors: Karel Van Den Berg, Bleskensgraaf (NL); Renatus Ignatius Josephus Fransen, Vlaardingen (NL)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 12/202,443

(22) Filed: Sep. 2, 2008

(65) Prior Publication Data

US 2008/0314323 A1    Dec. 25, 2008

Related U.S. Application Data

(62) Division of application No. 11/898,015, filed on Sep. 7, 2007, now Pat. No. 7,428,880, which is a division of application No. 10/849,802, filed on May 21, 2004, now Pat. No. 7,278,370.

(30) Foreign Application Priority Data

Mar. 23, 2003   (NL)   .................................... 1023508

(51) Int. Cl.
*A01J 5/017* (2006.01)
(52) U.S. Cl. ................. 119/14.02; 119/14.08
(58) Field of Classification Search .............. 119/14.02, 119/14.01, 14.08, 14.14, 14.18
See application file for complete search history.

(56) References Cited

U.S. PATENT DOCUMENTS

| 3,713,423 | A | * | 1/1973 | Sparr, Sr. | 119/670 |
|---|---|---|---|---|---|
| 4,838,207 | A | * | 6/1989 | Bom et al. | 119/14.02 |
| 4,867,103 | A | * | 9/1989 | Montalescot et al. | 119/14.08 |
| 4,941,433 | A | * | 7/1990 | Hanauer | 119/14.02 |
| 5,069,160 | A | * | 12/1991 | Street et al. | 119/14.08 |
| 5,379,721 | A | * | 1/1995 | Dessing et al. | 119/14.08 |
| 5,524,572 | A | * | 6/1996 | Dessing et al. | 119/14.02 |
| 6,158,394 | A | * | 12/2000 | Street | 119/753 |
| 6,167,839 | B1 | * | 1/2001 | Isaksson et al. | 119/14.08 |
| 6,189,486 | B1 | * | 2/2001 | Lindholm | 119/14.02 |
| 6,269,766 | B1 | * | 8/2001 | Birk | 119/14.1 |
| 6,279,507 | B1 | * | 8/2001 | van der Lely et al. | 119/14.01 |
| 6,425,345 | B1 | * | 7/2002 | Lind et al. | 119/14.02 |
| 6,463,877 | B1 | * | 10/2002 | van der Lely | 119/14.08 |
| 2003/0226506 | A1 | * | 12/2003 | van den Berg | 119/14.02 |

* cited by examiner

*Primary Examiner*—Yvonne R. Abbott
(74) *Attorney, Agent, or Firm*—David P. Owen; Howrey LLP

(57) ABSTRACT

A method of automatically milking a dairy animal by means of an automatic milking device, including successively the steps of automatic connection of a first teat cup to a first teat of the dairy animal, manipulating the first teat cup connected to the first teat to reduce interference with a second teat of the dairy animal, and automatic connection of a second teat cup to a second teat of the dairy animal.

18 Claims, 2 Drawing Sheets ures of the second teat and the subsequent connection of a teat cup can take place more accurately. Moreover, pushing away the first teat cup connected to the first teat enables a second teat that is pushed against the udder of a dairy animal by the first teat cup to come free from the udder, so that the position determination of said teat and the subsequent connection of a teat cup can take place accurately.

METHOD OF AUTOMATICALLY MILKING A DAIRY ANIMAL

CROSS REFERENCE TO RELATED APPLICATIONS

This filing is a divisional application under 37 C.F.R. § 1.53(b) of prior divisional application Ser. No. 11/898,015 filed on 7 Sep. 2007 which is a divisional of prior application Ser. No. 10/849,802 filed on 21 May 2004 and granted on 9 Oct. 2007.

BACKGROUND OF THE INVENTION

1. Field of the Invention

The invention relates generally to a method of automatically milking a dairy animal by means of an automatic milking device.

2. Description of the Related Art

Methods of automatic milking of dairy animals are known in which teat cups are automatically connected to the teats of the animal. A disadvantage of such known methods is that it is possible that, when a teat cup is being connected to a first teat, a second teat is pushed against the udder of the dairy animal by the connected teat cup. In that case automatic connection of a teat cup to the teat that is pushed against the udder sometimes appears to be impossible. The known methods may further have the disadvantage that automatic connection of teat cups to teats that are close to each other is difficult. In particular accurate determination of the position of teats that are close to each other is difficult.

Thus, there is a particular need for an automatic device and method by which the interference of teats with one another on milking a dairy animal is avoided.

BRIEF SUMMARY OF THE INVENTION

The present invention addresses these problems by providing a method of automatically milking a dairy animal, by means of an automatic milking device provided with first and second teat cups, the method comprising: automatically connecting the first teat cup to a first teat of the dairy animal; manipulating the first teat cup connected to the first teat by the first teat cup; and automatic connection of the second teat cup to the second teat of the dairy animal after the first teat cup has been connected to the first teat. By e.g. pushing away the first teat cup connected to the first teat the distance between the first and the second teat becomes greater, so that the position determination of the second teat and the subsequent connection of a teat cup can take place more accurately. Moreover, pushing away the first teat cup connected to the first teat enables a second teat that is pushed against the udder of a dairy animal by the first teat cup to come free from the udder, so that the position determination of said teat and the subsequent connection of a teat cup can take place accurately.

In an embodiment of a method according to the invention the position of the first and the second teat is measured prior to attaching the first teat cup. In particular the distance between the first and the second teat is measured. The measured distance is preferably compared with a threshold distance and manipulation is performed only if the measured distance is equal to or smaller than the threshold distance.

For an accurate connection of the second teat cup to the second teat it is advantageous if the method further comprises determining the position of the second teat, in particular prior to connecting the second teat cup and after manipulating the first teat cup.

For the purpose of accurately manipulating the first teat cup, an embodiment of the method according to the invention comprises the step of determining the position of the first teat cup connected to the first teat.

Manipulating a teat cup connected to a teat is preferably performed by a first robot arm belonging to the automatic milking device, on which robot arm a first position-determining device is disposed, which first position-determining device is suitable for determining the position of a teat and/or a teat cup. Pushing away the first teat cup connected to the first teat is preferably performed by the first robot arm.

In an embodiment of a method according to the invention, automatic connection of a teat cup to a teat of the dairy animal is performed by a second robot arm belonging to the device for automatically milking a dairy animal, which second robot arm is suitable for carrying at least temporarily a teat cup. The step of determining the position of a teat and/or a teat cup is preferably performed by a second position-determining device that is disposed on the second robot arm.

Although the method according to the invention may be carried out by using two different robot arms, it is advantageous for economical reasons if for the first and the second robot arm a single robot arm is used. Although the method according to the invention may be carried out by using two different position-determining devices, it is advantageous for economical reasons if for the first and the second position-determining device a single position-determining device is used.

Manipulating or pushing away the first teat cup connected to the first teat is performed in an advantageous manner by a second teat cup carried by the second robot arm.

In a favourable embodiment of a method according to the invention the first teat cup is pushed away substantially in a direction away from the second teat.

The invention also relates to a method of automatically milking a dairy animal having a first teat and at least one further teat by means of an automatic milking device, the method comprising automatically pushing the further teat or teats away from the first teat and connecting a teat cup to the first teat.

Another aspect of the invention comprises an automatic milking device for automatically milking a dairy animal having a first teat and at least one further teat, the automatic milking device comprising: at least one teat cup; a robot arm for connecting the teat cup to the first teat; and means for preventing interference of the further teat with the teat cup during the connection of the first teat.

According to one embodiment of the invention, the milking device may also comprise a detector for detecting a variable indicative of interference between the first teat and the further teat. The variable may be for instance the relative positions of the teats or the distance between them, either prior to or after connection of the first teat cup. It may also be a signal indicating an absence of the further teat should this have become trapped by the teat cup or it may also be a signal indicating failure to connect automatically a further teat cup to the further teat.

BRIEF DESCRIPTION OF THE DRAWINGS

An embodiment of a method according to the invention will be described hereinafter by way of example only with reference to the drawings, in which.

DESCRIPTION OF ILLUSTRATIVE EMBODIMENTS

The invention will be described hereinafter with reference to pushing away a first teat cup connected to a first teat, so that the first teat is automatically pushed away as well. However, it will be obvious that the invention can also be applied when the first teat is pushed away itself, in particular if the first and the second teat are close to each other. The invention is also described with reference to the embodiment in which pushing away is caused by a second teat cup carried by a robot arm, which second teat cup pushes away the connected first teat cup. However, it will be obvious that the first teat cup can also be pushed away by the robot arm without the latter carrying a further teat cup. The invention will further be described with reference to the embodiment in which for pushing away the first teat cup the robot arm is used that is also used for connecting the teat cups to the teats. However, it will be obvious that the invention can also applied to a separate robot arm or similar device for pushing away the teat. Furthermore, although reference is made to "pushing away" it will be understood that this is intended to encompass other forms of manipulation including pulling, knocking, waggling etc. according to the required direction of movement to e.g. release a trapped teat.

Figure 1:
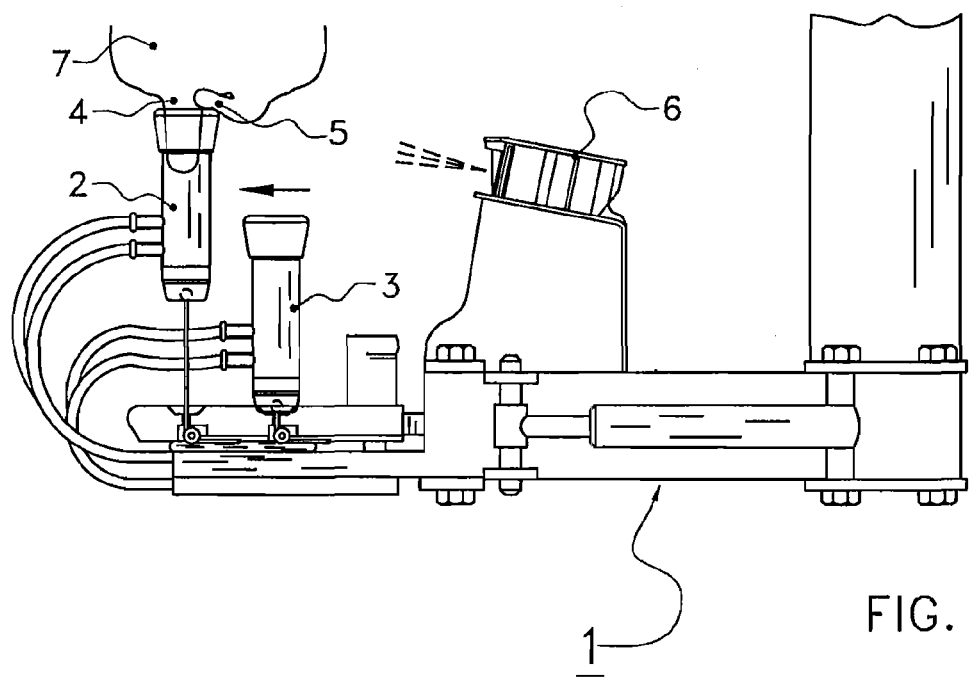
FIG. 1 shows a second teat that is pushed against the udder of an animal by a first teat cup connected to a first teat.

FIG. 1 shows a part of a device for automatically connecting a teat cup to a teat of a dairy animal. The device comprises a robot arm 1 for connecting a first teat cup 2 to a first teat 4 and for connecting a second teat cup 3 to a second teat 5. There is disposed a position-determining device 6 on the robot arm 1 for detecting the position of a teat and for detecting the position of a teat cup. It will be obvious that in another embodiment of the method according to the invention two different position-determining devices can be used.

In the situation shown in FIG. 1 the first teat cup 2 has been connected to the first teat after the position of the first teat has been determined. By the connection of the first teat cup 2 to the first teat 4 the second teat 5 has been pushed against the udder 7 of the dairy animal. Owing to this the connection of the second teat cup 3 to the second teat 5 is impeded, not only because the position of the second teat is difficult to determine but also because the second teat is not freely accessible.

Figure 2:
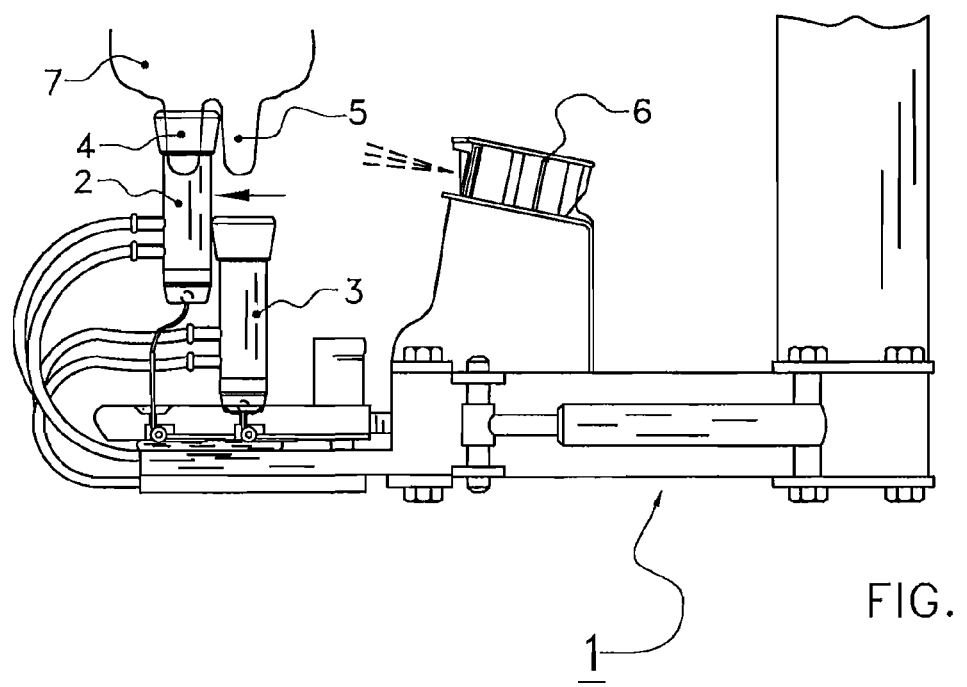
FIG. 2 shows the first teat cup connected to the first teat being pushed away by a second teat cup.
Figure 3:
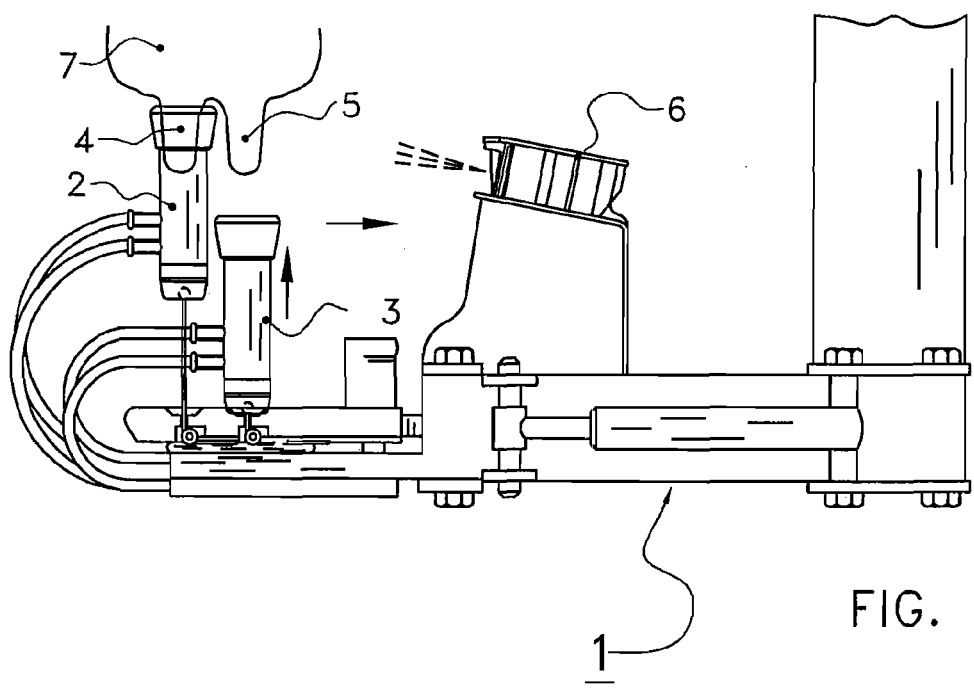
FIG. 3 shows the connection of the second teat cup to the second teat.

For the purpose of connecting the second teat cup 3 to the second teat 5 the robot arm 1 is moved in such a way that the second teat cup 3 carried by the robot arm 1 will touch the first teat cup 2 that is connected to the first teat 4 and will push it away, so that the second teat will come free from the udder 7, as shown in FIG. 2. The robot arm can be controlled in such a way that the second teat cup is moved to the measured position of the first teat, so that the second teat cup will push against the first teat cup. Then, with the aid of data from the position-determining device, the second teat cup 3 is moved to such a position relative to the second teat 5 that connection by upward motion is possible (see FIG. 3). In the case that the teats are close to each other it is possible that at the connection of the second teat cup the latter remains in abutment with the first teat cup.

Figure 4:
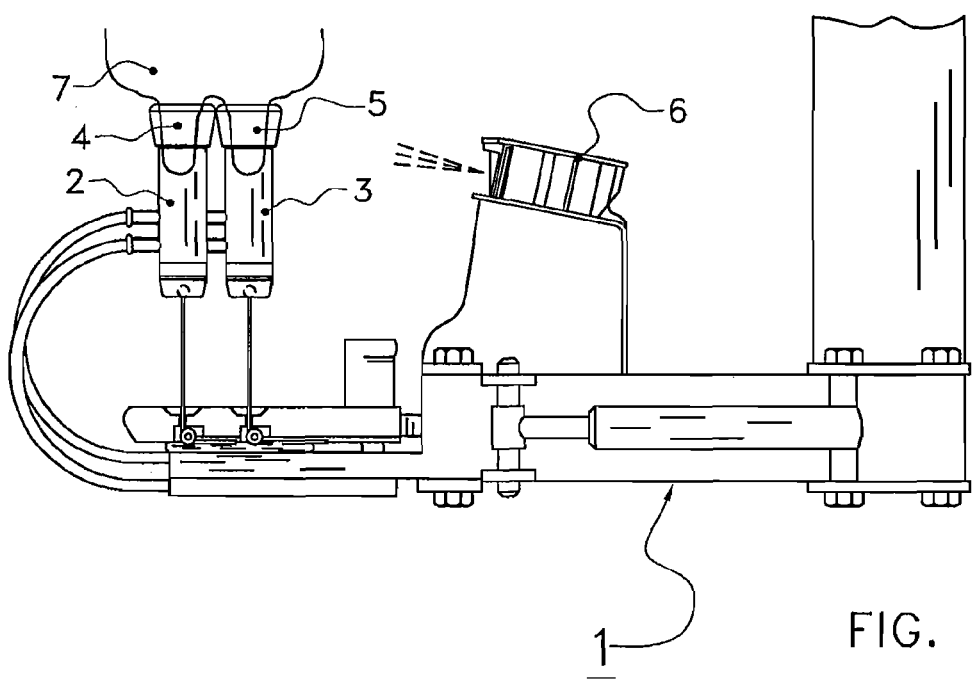
FIG. 4 shows the situation in which the second teat cup is connected to the second teat.

After the connection of the second teat cup 3 to the second teat 5 (as shown in FIG. 4) the milking of the quarter belonging to the second teat 5 can be started.

Pushing away a teat can be performed as a standard procedure for the connection of all the teat cups, it also being possible according to the invention to push against the relevant teat prior to the connection of the first teat cup. It is pointed out here that the relevant teat and/or one of the other teats can be pushed away. Alternatively it is possible to perform pushing away a teat only if the position-determining device detects that a teat is pushed against the udder of a dairy animal. It is also possible to perform pushing away a teat cup and/or a teat only if the position-determining device or another distance-measuring device suitable for the purpose has measured a distance between the first and the second teat that is equal to or smaller than a, preferably predetermined, threshold distance. To this end the measured distance is compared with the threshold distance. Besides, by means of pre-programming it is possible to perform pushing away only for particular dairy animals. To this end the method must comprise the step of identifying a dairy animal, and the step of comparing the detected identity with predetermined identities for which pushing away of teats should be performed. The latter is of importance with dairy animals that are known to have teats that are relatively close to each other. It is also possible to use data in relation to lactation stage and filling degree of the udder when determining whether pushing away a teat cup and/or a teat should be performed, because the distance between teats appears to depend on the lactation stage and/or the filling degree of the udder.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of automatically milking a dairy animal by means of an automatic milking device provided with first and second teat cups, the method comprising successively:
   automatically connecting a first teat cup to a first teat of the dairy animal;
   detecting a variable indicative of interference between the first and second teats;
   manipulating the first teat cup connected to the first teat to reduce interference with a second teat of the dairy animal if the variable indicates there is interference; and
   automatically connecting a second teat cup to the second teat.

2. The method as claimed in claim 1, further comprising determining the position of the second teat prior to connecting the second teat cup and after manipulating the first teat cup.

3. The method as claimed in claim 2, wherein for determining the positions of the teats a single position-determining device is used.

4. The method as claimed in claim 1, further comprising the step of determining the position of the first teat cup connected to the first teat.

5. The method as claimed in claim 1, wherein manipulation of a teat cup connected to a teat is performed by a robot arm belonging to the automatic milking device, on which robot arm a first position-determining device is disposed, the first position-determining device being suitable for determining the position of a teat or a teat cup.

6. The method as claimed in claim 5, wherein the manipulation of the first teat cup connected to the first teat is performed by the robot arm.

7. The method as claimed in claim 5, wherein automatic connection of a teat cup to a teat of the dairy animal is performed by a second robot arm belonging to the automatic milking device, the second robot arm being suitable for at least temporarily carrying a teat cup and wherein the position of a teat or a teat cup is determined by a second position-determining device that is disposed on the second robot arm.

8. The method as claimed in claim 1, wherein automatic connection of a teat cup to a teat of the dairy animal is performed by a robot arm belonging to the automatic milking device, the robot arm being suitable for at least temporarily carrying a teat cup.

9. The method as claimed in claim 1, wherein connecting and manipulating the teat cups is performed by a single robot arm.

10. The method as claimed in claim 1, wherein the manipulation of the first teat cup connected to the first teat is performed by a second teat cup carried by the second robot arm.

11. The method as claimed in claim 1, wherein during manipulation the first teat cup is pushed away substantially in a direction away from the second teat.

12. The method as claimed in claim 1, wherein the variable comprises the relative positions of the teats.

13. The method as claimed in claim 1, wherein the variable comprises the distance between the teats.

14. The method as claimed in claim 1, wherein the variable comprises a signal indicating an absence of the second teat.

15. The method as claimed in claim 1, wherein the variable comprises a signal indicating that the second teat has become trapped by the first teat cup.

16. The method as claimed in claim 1, wherein the variable comprises a signal indicating a failure to connect automatically the second teat cup to the second teat.

17. The method as claimed in claim 1, farther comprising identifying the dairy animal, and wherein the variable comprises a predetermined dairy animal identity.

18. The method as claimed in claim 1, farther comprising identifying the dairy animal, and wherein the variable comprises a predetermined lactation stage or filling degree of the udder of the identified dairy animal.

\* \* \* \* \*